United States Patent
Alvarez et al.

(10) Patent No.: US 7,068,150 B2
(45) Date of Patent: Jun. 27, 2006

(54) UPS SIGNALING STATE

(75) Inventors: Julio Alvarez, Cary, NC (US); Richard John Kairis, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 10/374,028

(22) Filed: Feb. 25, 2003

(65) Prior Publication Data

US 2004/0164849 A1  Aug. 26, 2004

(51) Int. Cl.
*H04M 11/04* (2006.01)

(52) U.S. Cl. .............................. 340/310.11; 340/310.12; 713/300

(58) Field of Classification Search ........... 340/310.02; 713/300–340
See application file for complete search history.

(56) References Cited

U.S. PATENT DOCUMENTS

| | | | | |
|---|---|---|---|---|
| 3,873,961 A | | 3/1975 | Lee et al. ................... 340/15.5 |
| 3,938,129 A | | 2/1976 | Smither ....................... 340/310 |
| 4,136,327 A | | 1/1979 | Flanders et al. .............. 340/18 |
| 4,634,888 A | * | 1/1987 | Deavenport ................. 307/48 |
| 4,673,825 A | * | 6/1987 | Raddi et al. ................... 307/66 |
| 4,860,185 A | * | 8/1989 | Brewer et al. ................ 363/41 |
| 4,876,539 A | | 10/1989 | Farque ........................ 340/856 |
| 4,959,774 A | * | 9/1990 | Davis ............................. 714/6 |
| 5,289,045 A | * | 2/1994 | Lavin et al. ................... 307/64 |
| 5,515,038 A | | 5/1996 | Smith ....................... 340/853.3 |
| 5,670,931 A | | 9/1997 | Besser et al. .......... 340/310.01 |
| 6,301,674 B1 | * | 10/2001 | Saito et al. ................... 713/340 |
| 6,463,495 B1 | * | 10/2002 | Angelo et al. .............. 710/305 |
| 6,526,516 B1 | * | 2/2003 | Ishikawa et al. ............ 713/340 |
| 6,822,555 B1 | * | 11/2004 | Mansfield et al. ...... 340/310.01 |

* cited by examiner

*Primary Examiner*—Thomas J. Mullen, Jr.
*Assistant Examiner*—Son Tang
(74) *Attorney, Agent, or Firm*—Richard F. Frankeny; Winstead Sechrest & Minick P.C.; Mark E. McBurney

(57) ABSTRACT

A system receives AC power from an Uninterruptable Power Supply (UPS) on an AC power cable. The AC power cable couples a primary AC line voltage or a switched secondary AC line voltage depending on the quality of the primary AC line voltage. The UPS has a modulating circuit with a power line carrier protocol that receives a power down signal from the UPS if the primary AC line voltage indicates that the system should power down in a controlled manner or take other power down actions. The modulating circuit generates a modulated power down signal that is coupled to the AC power cable. The system has a corresponding demodulating receiving circuit with the power line carrier protocol that receives the modulated power down signal and regenerates the power down signal. The power down signal is coupled to circuitry in the system that initiates power down sequencing options.

8 Claims, 3 Drawing Sheets

UPS SIGNALING STATE

TECHNICAL FIELD

The present invention relates in general to an Uninterruptable Power Supply (UPS) and in particular to communication between the UPS and the system it is powering.

BACKGROUND INFORMATION

Stationary systems, and in particular, stationary computer systems are normally coupled to a wall outlet that provides 60 Hz AC power. Since a variety of power line failures may cause a computer system to power down in an uncontrolled manner, a computer system with high reliability and a guaranteed ON time requirement may use an Uninterruptable Power Supply (UPS). In order to improve performance, computers are increasingly using write back caches, which means that updated data intended for the disk is temporarily stored in RAM. If a power failure occurs, there is more of a chance that new data will be lost, thus UPS systems are becoming important for all computers.

A UPS is a backup power system used when the electrical power line fails or drops to an unacceptable voltage level. Small UPS systems may only provide power from a battery for a few minutes which is enough to power down the computer in an orderly manner. Sophisticated systems are tied to electrical generators that can provide power for days. A UPS system may be connected to a file server so that, in the event of a problem, all network users may be alerted to save files and shut down immediately. There are a variety of UPS systems, an online UPS, a standby or offline UPS, and a line interactive UPS. An online UPS provides a constant source of electrical power from the battery, while the batteries are being recharged from AC power. A standby UPS normally draws current from the AC outlet and switches to battery within a few milliseconds after detecting a power failure. The line interactive UPS is a hybrid of the online and standby units. Like the standby, it does not constantly draw from the battery, but it switches to battery faster when required. In addition, the line interactive unit does not use the battery when low voltage is encountered. It uses extra power from the AC source to make up the difference in voltage. Since most all computer systems use AC power as its primary input, the UPS system also couples AC power to the computer using the same type of AC power cable that normally plugs into a wall outlet.

A UPS system is a separate unit and must communicate with the computer that it is powering, for example, if it senses a problem with the primary AC line voltage. This communication is normally done using a RS232 or Universal Serial Bus (USB) protocol. This requires the UPS and the computer to have a separate data cable with connectors and a UPS side receptacle for the data cable in order for the information from the UPS system to be coupled to the computer. This separate data cable and connector and any required RS232 or USB drivers and receivers may add cost to the computer system and the UPS as well as using a port input that could be used for another input/output (I/O) device.

There is, therefore, a need for a method and an apparatus to allow a UPS system to communicate to the computer it is powering without the addition of RS232 or USB circuitry, cable, and required port connection.

SUMMARY OF THE INVENTION

A UPS is equipped with a power line carrier modulating device (e.g., like an X10 protocol modulator) that modulates a high frequency carrier signal with power down data. The modulated carrier signal is then coupled to the power cable supplying 60 Hz AC power to a computer system it is powering. The power line carrier device in the UPS may use simple frequency modulation (FM) or complex Spread Spectrum techniques for sending the modulated data to a computer system depending on the needed reliability. The computer system is likewise equipped with a corresponding power line carrier demodulating device that is coupled to the AC power cable to demodulate the carrier signal to recover the power down data sent from the UPS device. The recovered power down data is coupled to circuitry in the computer system that controls the power down sequencing. In this manner, a cable is eliminated and a communication port input to the computer system is free for use with another input/output device.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof reference is now made to the following descriptions taken in conjunction with the accompanying drawings, in which.

DETAILED DESCRIPTION

Figure 1:
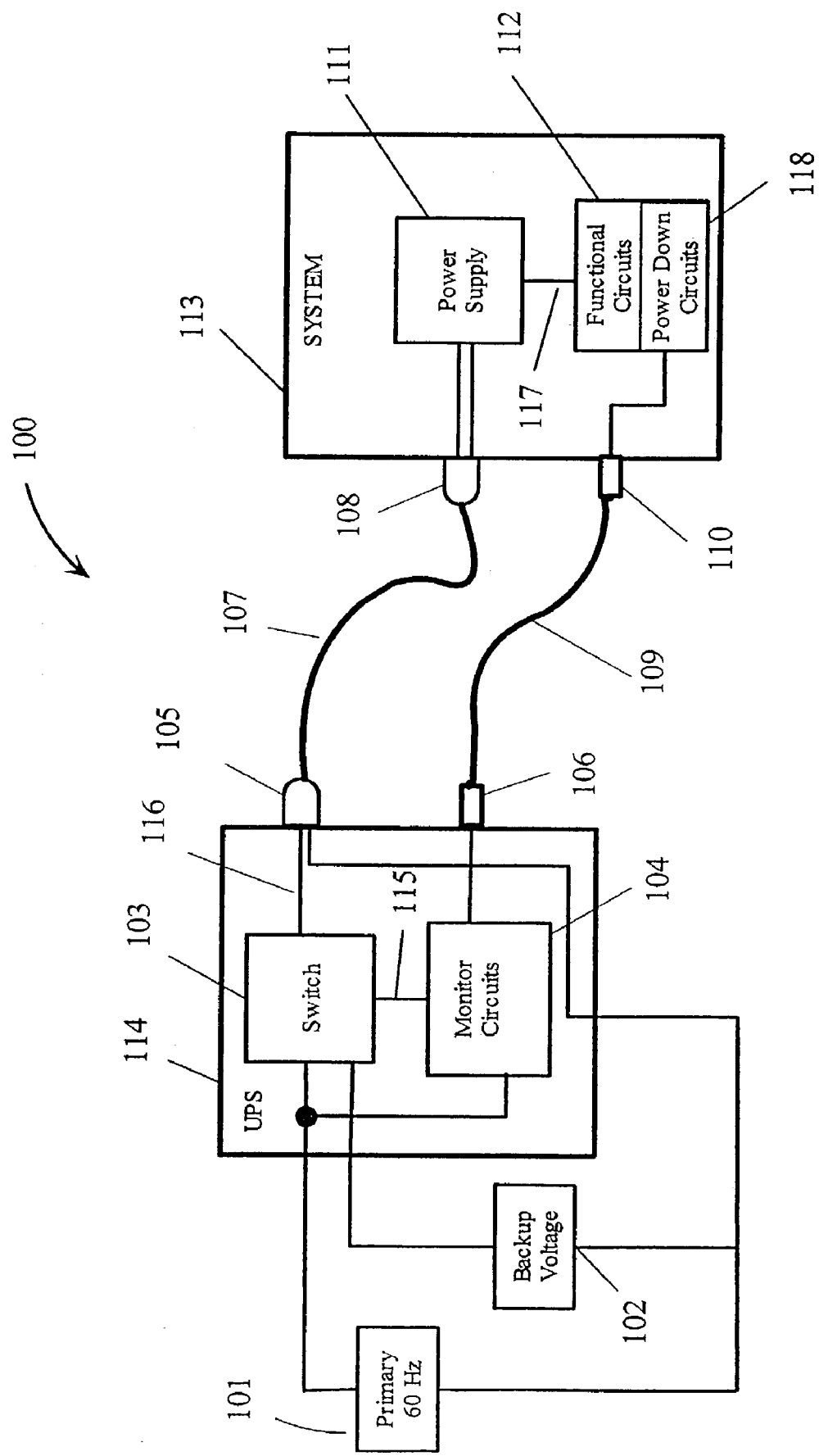
FIG. 1 is a block diagram of a computer system and an UPS system according to prior art.

In the following description, numerous specific details are set forth to provide a thorough understanding of the present invention. However, it will be obvious to those skilled in the art that the present invention may be practiced without such specific details. In other instances, well-known circuits may be shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Power line carrier modulation/demodulation (Modem) systems have been used for years to enable various types of signals to be sent over the AC power line within a transformer drop. Early systems were used to send audio to powered speakers which could then be placed anywhere inside or outside a residence where a power outlet was available. Recent efforts to create an in home computer network using the same idea has lead to more sophisticated power line carrier Modems where more reliability is desired. Therefore, a variety of power line carrier protocols may be found that determine the complexity of the circuitry needed to send data or signals over a power line carrier network using the power line itself.

X10 is one such power line carrier protocol standard that has been used for years to send signals for automating devices in the home. It transmits up to 256 low-voltage coded signals over existing electrical wiring in the home. Receiving units typically have dials that can be set to a specific address. Commonly used as remote lighting switches and for turning appliances on and off, X10 signaling is also built into many third-party products that compete directly with X10. PowerPacket is another recent protocol developed by Intellon Corporation that is used for power line carrier systems.

FIG. 1 is a block diagram of a prior art UPS/system configuration 100. UPS 114 receives primary voltage 101 and backup voltage 102 in a switch 103. Monitor circuits 104 monitor the quality of primary power 101. If monitor circuits 104 determine that the quality of the input power is below an acceptable level, it signals switch 103 with a signal 115 to switch backup voltage 102 to output 116. Output 116 provides AC power to system 113 via AC power cable 107 that has connectors 105 and 108. In many instances, AC power cable 107 may be an industry standard power cable. Typically, AC power for system 113 is coupled to a power supply 111 that generates low voltages 117 for functional circuits 112 in system 113. UPS 114 provides backup power for a limited or extended time either from a battery, some type of motor generator, or fuel cell source. In either case, UPS 114 may have to communicate to system 113 to signal when to start a controlled power down sequence in the event that backup power (e.g., backup voltage 102) will terminate due to depletion of the backup power source. In this event, monitor circuits 104 would send a power down signal via a communication link established by data cable 109 with connectors 106 and 110. Data cable 109 normally is plugged into one of the communication ports on the system (e.g., RS232 or USB ports). The power down signal typically has serial data and is coupled to power down circuits in system 113 that control the sequence of operations required prior to backup power being terminated. Prior to a power shut-down, system 113 saves data, determines which applications to close, powers down circuits or sub-systems in a certain order, etc. If system 113 is a computer system, then data cable 109 occupies one of the communications ports that would normally be used for an input/output (I/O) device.

Figure 2:
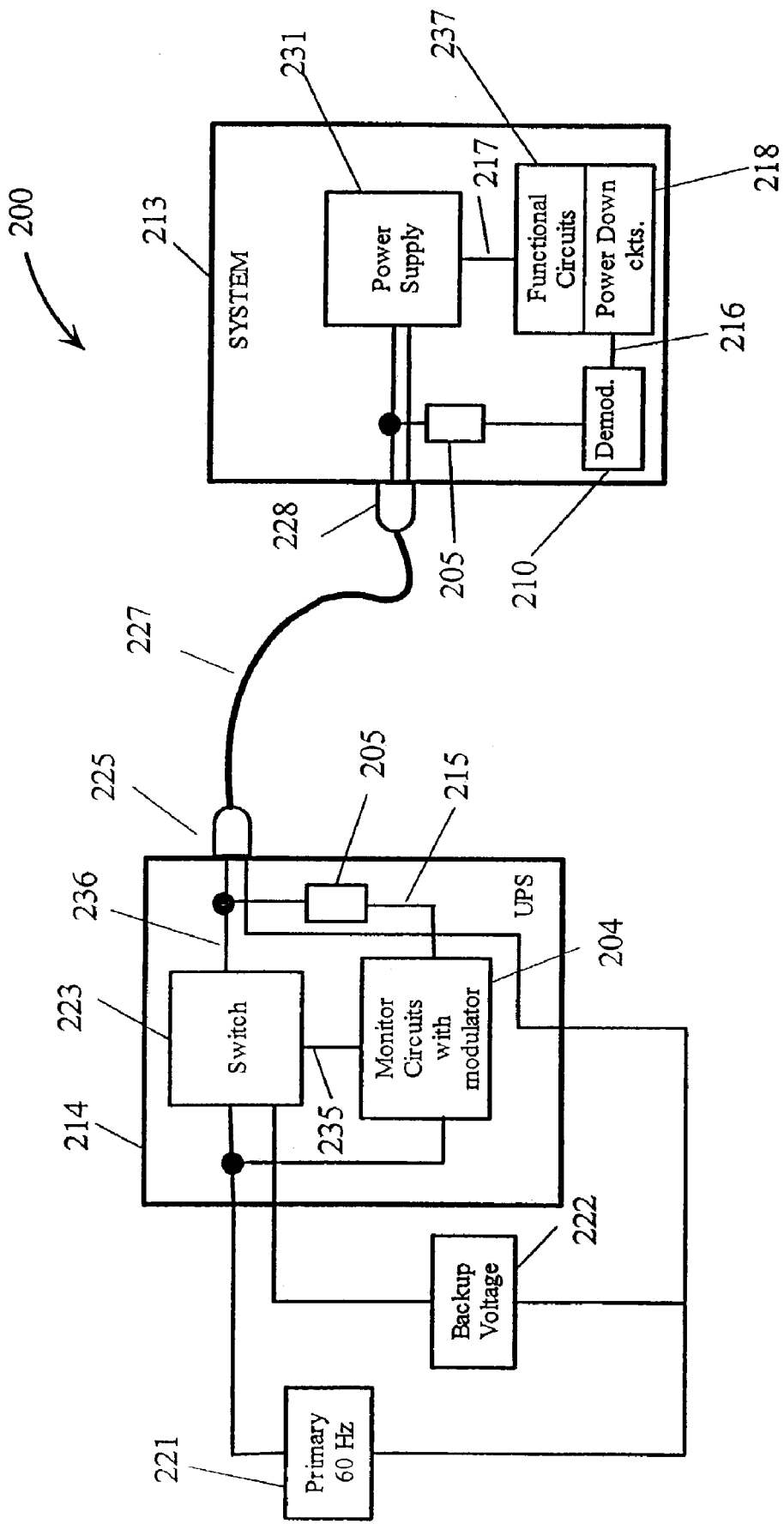
FIG. 2 is a block diagram of a computer system and an UPS system according to embodiments of the present invention.

FIG. 2 is a block diagram of a UPS/System configuration 200 according to embodiments of the present invention. UPS 214 receives primary power 221 and back up voltage 222 in a switch 223. Monitor circuits 204 include circuitry for monitoring the quality of primary power 221 as well as a power line carrier modulating circuit. If the monitoring circuits 204 determine that the quality of primary power 221 is below an acceptable level, it signals switch 223 with signal 235 to switch output 236 to backup voltage 222. Output 236 is coupled to system 213 via power cable 227 which has connectors 225 and 228. In many cases, power cable 227 is an industry standard AC power cable. Output 236 supplies AC power to power supply 231 which in turn provides low voltages 237 to functional circuits 212 in system 213. UPS 214 provides backup power for a limited or extended time either from a battery, some type of motor generator, or fuel cell source. In either case, UPS 214 may have to communicate to system 213 to signal when to start a controlled power down sequence in the event that backup power will terminate due to depletion of the backup power source (e.g., backup voltage 222). Monitor circuits 204 include a power line carrier modulator which modulates the carrier signal with a power down signal (power down data) creating a modulated power down signal 215. The modulated power down signal 215 is coupled to power cable 227 with coupling circuit 205. In many cases coupling circuit 205 is simply a small value capacitor (not shown) that blocks the 60 Hz frequency of the power line while allowing the frequency or frequencies of the power line carrier to pass. Coupling circuit 205 may also be a more complex high pass or band pass filter. Coupling circuit 205 also has a means of electrically connecting the capacitor or filter to power line cable 107. System 213 also includes power line carrier demodulator circuit 210 which is likewise coupled to power cable 227. Power line demodulator 210 would also be electrically coupled to power line cable 227 with a coupling circuit 205 as described above to again block the 60 Hz frequency of the power line while passing the power line carrier signal.

The power down signal is recovered by demodulator 210 and is coupled to power down circuits 218 that control the sequence of required operations executed by system 213 prior to backup power being terminated. Prior to a power shut-down, system 213 may save data, determine which applications to close, power down specific circuits or sub-systems in a certain order, etc. Using embodiments of the present invention, cable 229 with connectors 226 and 230 (used in prior art system 100 in FIG. 1) are eliminated. This leads to less cabling required for UPS/system 200 as well as freeing a port connection to system 213 for other uses.

The system power down protocol used by system 213 does not have to change using embodiments of the present invention, only the circuits used to couple the power down signal to the power down circuit need change. System 213 may have multiple power down modes depending on the type of action signaled by UPS 214. UPS 214 may signal system 213 to go into low power mode, switch OFF selected functions or units, or to initiate a full scale power down sequence.

Figure 3:
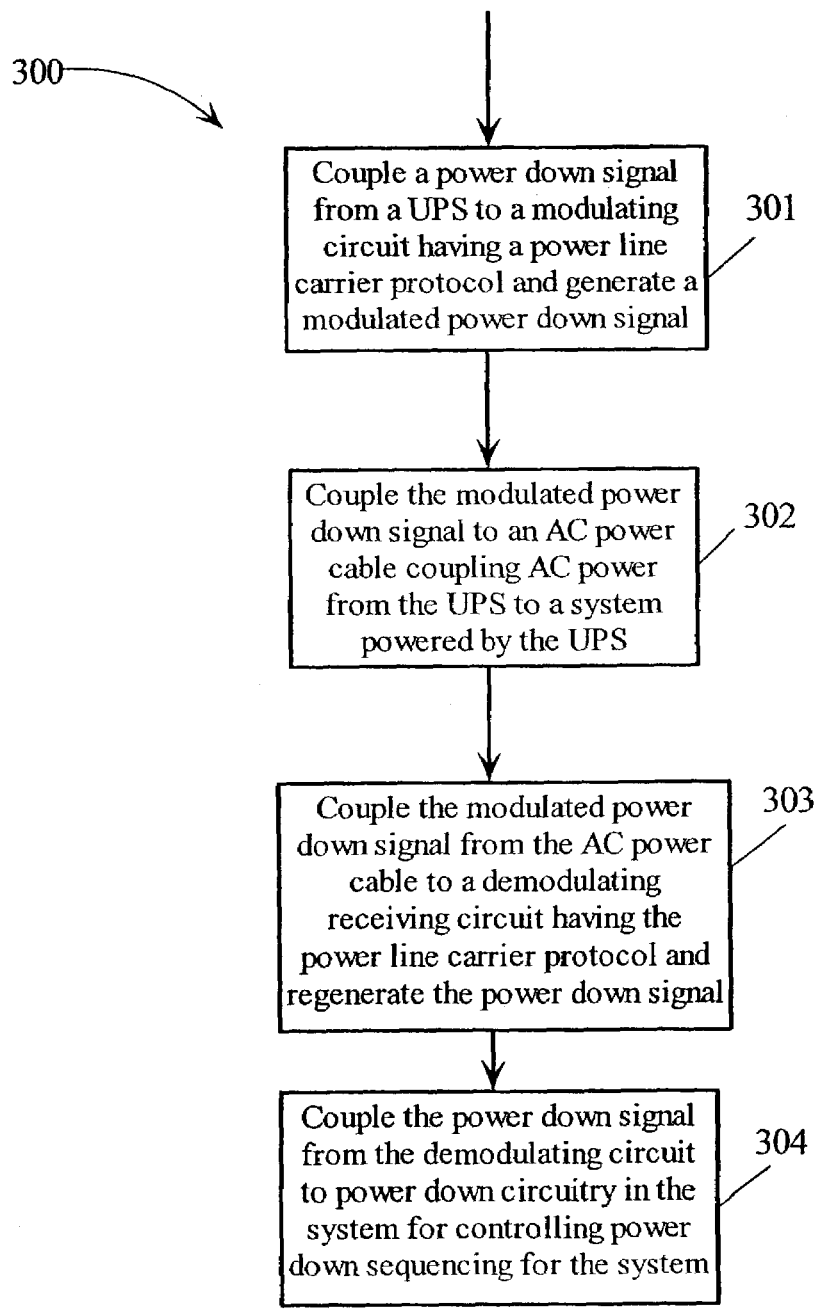
FIG. 3 is a flow diagram of method steps used in embodiments of the present invention.

FIG. 3 is a flow diagram of method steps used in embodiments of the present invention. In step 301, a power down signal (not shown but in 204) from a UPS 214, providing power to a system, is coupled to a modulating circuit (in 204) having a power line carrier protocol. The modulating circuit generates modulated power down signal 215. In step 302, the modulated power down signal 205 is coupled (via circuit 205) to an AC power cable 227 that couples AC power from UPS 214 to the system 213. In step 303, the modulated power down signal 215 is coupled from the AC power cable 227 to a demodulating receiving circuit 210 having the power line carrier protocol. The demodulating receiving circuit 210 regenerates the power down signal (now labeled 216). In step 304 the power down signal 216 is coupled from the demodulating receiving circuit 210 to power down circuitry 218 in system 213 that controls power down sequencing for system 213. Power down actions are initiated based on data in the power down signal 216.

Although the present invention and its advantages have been described in detail, it should be understood that various changes, substitutions and alterations can be made herein without departing from the spirit and scope of the invention as defined by the appended claims.

What is claimed is:

1. A system for sending a power down signal from an Uninterruptible Power Supply (UPS) to a system receiving AC power from said UPS comprising:
   circuitry for coupling said power down signal from said UPS to an input of a modulating circuit having a power line carrier protocol, said modulating circuit generating a modulated power down signal;
   circuitry for coupling said modulated power down signal to an AC power cable coupling said AC power from said UPS to said system;
   circuitry for coupling said modulated power down signal from said AC power cable to a demodulating receiving circuit having said power line carrier protocol, said demodulating receiving circuit regenerating said power down signal;
   circuitry for coupling said power down signal from said demodulating receiving circuit to power down circuitry in said system for controlling a power down sequence for said system;
   determining if a primary power source to said UPS meets an acceptable quality; and
   switching from said primary power source to a secondary power source in response to said determining step and generating said power down signal.

2. The system of claim 1, wherein said power line carrier protocol comprises an X10 protocol or a PowerPacket protocol.

3. A method for sending a power down signal from a Uninterruptible Power Supply (UPS) to a system receiving AC power from said UPS comprising the steps of:
   coupling said power down signal from said UPS to an input of a modulating circuit having a power line carrier protocol, said modulating circuit generating a modulated power down signal;
   coupling said modulated power down signal to an AC power cable coupling said AC power from said UPS to said system;
   coupling said modulated power down signal from said AC power cable to a demodulating receiving circuit having said power line carrier protocol, said demodulating receiving circuit regenerating said power down signal;
   coupling said power down signal from said demodulating receiving circuit to power down circuitry in said system for controlling a power down sequence for said system;
   determining if a source of a primary power line voltage coupled to said UPS meets an acceptable quality; and
   switching from said primary power line voltage to a secondary power line voltage in response to said determining step and generating said power down signal.

4. The method of claim 3, wherein said power line carrier protocol comprises an X10 protocol or a PowerPacket protocol.

5. A system for sending a power down signal from an Uninterruptible Power Supply (UPS) to a system receiving AC power from said UPS comprising:
   an UPS receiving a primary power source and a secondary power source;
   circuitry for monitoring said primary power source and generating a power down signal in response a quality of said primary power source;
   circuitry for modulating a carrier signal with said power signal generating a modulated power down signal;
   circuitry for coupling said modulated power down signal to a power cable supplying AC power to said system from said UPS;
   circuitry for receiving and demodulating said modulated carrier signal to regenerate said power down signal;
   circuitry for coupling said power down signal to circuitry in said system for controlling power down sequencing said system in response to said power down signal;
   circuitry for determining if said primary power source coupled to said UPS meets an acceptable quality; and
   circuitry for switching from said primary power source to said secondary power source in response to said determining step.

6. The system of claim 5, wherein said system comprises a computer server or a personal computer.

7. A method for sending a power down signal from an Uninterruptible Power Supply (UPS) to a system receiving AC power from said UPS comprising the steps of:
   receiving a primary power source and a secondary power source in a UPS;
   monitoring said primary power source and generating a power down signal in response to a quality of said primary power source;
   modulating a carrier signal with said power signal thereby generating a modulated power down signal;
   coupling said modulated power down signal to a power cable supplying AC power to said system from said UPS;
   receiving and demodulating said modulated carrier signal to regenerate said power down signal;
   coupling said power down signal to circuitry in said system for controlling power down sequencing said system in response to said power down signal;
   controlling power down sequencing operations in said system in response to states of said power down signal
   determining if said source of a primary power line voltage coupled to said UPS meets an acceptable quality; and
   switching from said primary power source to said secondary power source in response to said determining step.

8. The method of claim 7, wherein said system comprises a computer server or a personal computer.

* * * * *